United States Patent [19]
Walther

[11] 3,722,387
[45] Mar. 27, 1973

[54] CARTRIDGE ESPECIALLY FOR FILM

[75] Inventor: Bernhard Walther, Dessau, Germany

[73] Assignee: VEB Filmfabriken, Wolfen, Germany

[22] Filed: July 12, 1971

[21] Appl. No.: 161,808

[52] U.S. Cl. .................. 95/31 R, 352/72, 352/78 C
[51] Int. Cl. ............................................. G03b 19/04
[58] Field of Search...... 95/31 R; 352/72, 78 R, 78 C; 220/55, 55 R, 60 R

[56] References Cited

UNITED STATES PATENTS

| 3,490,348 | 1/1970 | Ariyasu | 325/78 C |
| 3,139,789 | 7/1964 | Schrader | 352/72 |
| 2,466,524 | 4/1949 | Williams | 352/78 R |
| 2,195,999 | 4/1940 | Reibold | 220/60 R |
| 2,238,238 | 4/1941 | Westrope | 220/60 R |

FOREIGN PATENTS OR APPLICATIONS

| 672,947 | 11/1965 | Belgium | 352/78 C |

Primary Examiner—Samuel S. Matthews
Assistant Examiner—Monroe H. Hayes
Attorney—Nolte and Nolte

[57] ABSTRACT

The outer wall of a cartridge containing photographic film or the like is combined with, or assembled with the aid of, at least one indicator pin. The head of the pin is so shaped, or otherwise so arranged, as to cause selective responses, dependent on the contents of the cartridge. The pin structure is fastened by resilient action.

5 Claims, 6 Drawing Figures

PATENTED MAR 27 1973　　3,722,387

INVENTOR
BERNHARD WALTHER

BY Nolte & Nolte

ATTORNEYS

CARTRIDGE ESPECIALLY FOR FILM

BACKGROUND AND NATURE OF THE INVENTION

Various arrangements are known wherein a camera automatically responds to certain characteristics (such as speed) of the film to be used in it. Particularly such response has been obtained by rigid markers, integrally formed on a film cartridge, or secured thereto, at certain points of the cartridge which contact predetermined points of the camera structure on insertion of the cartridge. Rivets have been used for such purposes, on metal cartridges, but have been found hard or impossible to use, particularly on cartridges made of synthetic plastics, and their attachment by riveting tools and the like adds to the cost of the cartridge.

In some cases, in order to provide a plurality of interrelated data, stepped cams have been attached to the cartridge. However, they have been hard to test or utilize in and by the camera structure.

Devices of these types are known for example from Austrian Pat. No. 258,706.

It is the object of the invention to provide improved marking means for such purposes.

This has been achieved by using, instead of the earlier cartridge features and rivets, a pin and particularly a self-locking pin having a head on the surface of the cartridge and a shank reaching into the cartridge structure and anchored therein, the head of the pin being of such form, size and character that the camera can respond thereto.

DRAWINGS

FIG. 5b is a detail view, showing a detail from FIG. 5a.

Figure 1:
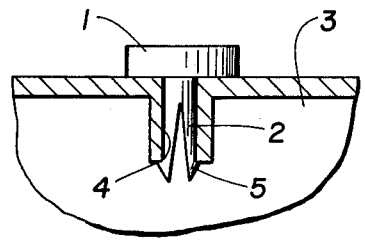
FIG. 1 is an enlarged fragmentary sectional view of a first embodiment of the invention.

Referring initially to FIG. 1: In this case, the head 1 of pin 2 extends slightly above the outside surface of film cartridge 3. The pin has a shank in the form of an expanding spring member, extending through and slightly beyond bore hole 4 in cartridge 3 and having barbs 5 at the end of the expanding pin elements, for resilient engagement with the underside of the bore hole structure. Depending on the number, size, shape and other characteristics of pinhead 1 on the outside of cartridge 3, the cartridge enables both users and cameras to respond to different cartridge and pin combinations, thereby distinguishing between the different characteristics of the film (not shown) which is disposed in the cartridge. When cartridge 3 is inserted in a camera, adapted to it, pinhead 1 depresses or tilts or otherwise moves a suitable feeler, thereby adjusting the camera to the film stored in the cartridge. The feeler (not shown) can be spring-loaded, as is known to the art.

Figure 2:
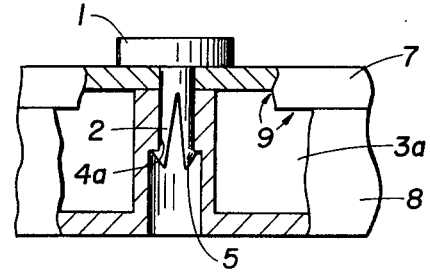
FIG. 2 is a similar view of a second embodiment.

As indicated in FIG. 2, it is also possible to make a bore hole structure for engagement with a pin and head (or inversely, a pin structure for engagement with a bore hole structure) a fixed part of the cartridge. As also shown, it is possible by provisions of this king to utilize the pin and bore hole combination additionally as a means for holding the cartridge assembled. Thus cartridge 3a according to FIG. 2 may have upper and lower parts 7 and 8 and this latter part, as shown, has a bore hole element 4a incorporated therein as a fixed part thereof. The same pin 1, 2 may be used that has been shown in FIG. 1. In the present case, the barbs 5 of this pin engage a suitable shoulder of the inside of bore hole element 4a. Of course, suitable light seal construction is provided in area 9 where the cartridge portions 7 and 8 are interconnected.

In each of these embodiments it is often preferable to form pinhead 1 in cylindrical form, thereby making the general handling thereof very similar to the handling of conventional rivets, although the assembly operation is considerably simpler in accordance with the invention, than any application of rivets. By suitably selecting the diameter, height and location of pinhead 1, on the surface of cartridge 3 or 3a both users and cameras are enabled to suitably respond to the film inserted in the particular cartridge. For example, different speeds of film can be represented by different pinhead diameters, while different lengths of film can be represented by different heights of pinheads. Cameras, of construction which need not be shown, determine the diameter of the pinhead by known automatic caliper type feelers. For this purpose, the cylindrical form of the head is useful as it allows better response than the usual rivets do and as it does not require special adjustment with regard to the rotary position of the pinhead in the camera.

The pinheads can be distinguished also by color, not only for visual distinction but for automatic selection, particularly when the cartridges are sorted automatically to supply films of the same type to suitable developing systems. For example, when a cartridge contains black and white negative film, it can be marked distinctively by a black pinhead 1; if it contains black and white reversal film the pinhead can be white; for color reversal film it can be red and yellow and for color negative film it can be green and blue.

Figure 3:
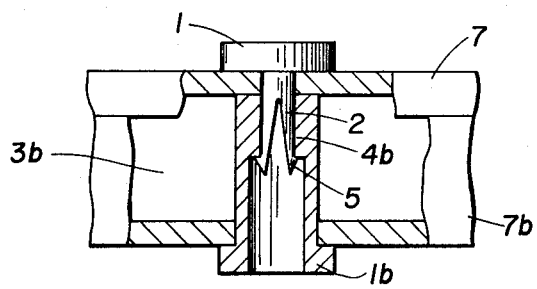
FIG. 3 is a similar view of a third embodiment.
Figure 4:
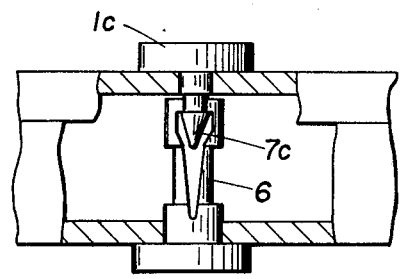
FIG. 4 is a similar view of a fourth embodiment.

When a cartridge can be inserted in two different positions it is desirable to use a pair of pinheads, as suggested by FIGS. 3 and 4. In this case, the standard pin 1, 2 can be used on the surface of upper portion 7 of cartridge 3b, while hollow pin 1b is inserted, coaxially with 1 in the surface of lower cartridge portion 7b. Standard pin 1 and hollow pin 1b are interconnected in the same way as has been shown in FIG. 2.

As particularly shown in FIG. 4, instead of a relatively large hollow pin there can be used a resiliently contracting pin 6 having a claw-like end which engages a solid conical pin portion 7c of the other pin 1c.

Figure 5A:
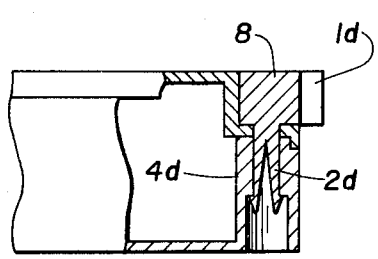
FIG. 5a is a similar view of a fifth embodiment, taken along lines A—A in FIG. 5b.
Figure 5B:
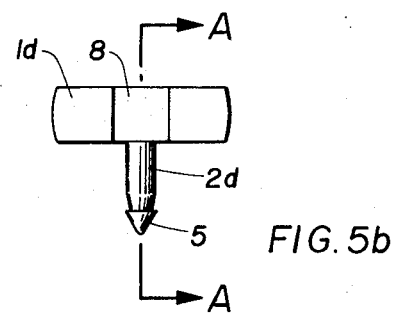

As finally shown in FIGS. 5a and 5b, the pinhead and pin can also be disposed angularly with respect to one another, preferably at an angle of 90°. In this case, a suitable connecting member 8 connects pin shank 2d with the laterally protecting pinhead or pinheads 1d. The engagement with the cartridge bore 4d can be the same as in FIG. 2 or 3.

It will be seen that the invention has the advantage that various data can be supplied to the response mechanism by simple and inexpensive means, which in fact promote positive response. A further advantage is that extra labor for insertion of film markers is totally avoided when the pins at the same time are used as closure elements of the film cartridge. The new marker, or combined marker and fastener, can be used on cartridges for photographic film, sound tape, video tape, and other films or tapes, although its form, as shown, is particularly useful for film magazines.

What is claimed is:

1. In a film or tape cartridge comprising at least two units and means fastening the units together, the improvement comprising a fastener functioning both to fasten together the two units and to designate the type of film or tape in the cartridge, the fastener including a pin having a head and a shank, an abutment formed on the shank, means for engaging the abutment and thereby locking with the pin, the shank of the pin extending through at least one of the units and the head of the pin being located outside the cartridge, said engaging means being connected to at least one other of the units, the head of the pin being coded by shape, color or marking to designate the type of film or tape in the cartridge.

2. In a film or tape cartridge improvement according to claim 1, in which the abutment is formed on a free end of the shank.

3. In a film or tape cartridge improvement according to claim 1, in which the shank is longitudinally divided in the form of at least two arms, and the abutment comprises a barb at the free end of at least one of the arms.

4. In a film or tape cartridge improvement according to claim 1, in which the means for engaging the abutment comprises a second pin, the second pin having a shank longitudinally divided in the form of at least two arms, said engaging means comprising an abutment formed at the free end of at least one of the arms of the second pin for engaging the abutment on the first pin.

5. In a film or tape cartridge improvement according to claim 1, in which the means for engaging the abutment comprises the periphery of an aperture defined through one of the units and through which the shank of the pin extends.

* * * * *